United States Patent [19]
Vanacore et al.

[11] Patent Number: 5,979,636
[45] Date of Patent: Nov. 9, 1999

[54] METHOD AND AUTOMATIC SYSTEM FOR PHASING ADVANCING ARTICLES HAVING A PLANAR SUPPORTING BASE

[75] Inventors: Giuseppe Vanacore, Via Ferrarecce; Lanfranco Reali, Via Nationale, both of Italy

[73] Assignee: Alcatel Alsthom, Paris, France

[21] Appl. No.: 08/889,237

[22] Filed: Jul. 8, 1997

[30] Foreign Application Priority Data

Jul. 6, 1996 [IT] Italy ................................. MI96A1403

[51] Int. Cl.$^6$ .................................................. B65G 47/26
[52] U.S. Cl. ........................................ 198/460.1; 198/575
[58] Field of Search ........................... 198/459.1, 459.8, 198/460.1, 461.1, 461.2, 781.05, 781.06, 780, 575, 576, 577

[56] References Cited

U.S. PATENT DOCUMENTS

| | | | |
|---|---|---|---|
| 4,120,393 | 10/1978 | Motooka et al. ................. | 198/460.1 |
| 4,240,538 | 12/1980 | Hawkes et al. ................. | 198/575 X |
| 4,514,963 | 5/1985 | Bruno ............................... | 53/493 |
| 4,852,717 | 8/1989 | Ross et al. ........................ | 198/462 |
| 4,921,092 | 5/1990 | Crawford et al. ................ | 198/460 |
| 5,038,915 | 8/1991 | Delsanto ...................... | 198/460.1 X |
| 5,058,727 | 10/1991 | Jahns et al. ..................... | 198/460.1 |
| 5,070,995 | 12/1991 | Schaffer et al. ................. | 198/460 |
| 5,137,139 | 8/1992 | Ruscello ...................... | 198/460.1 |
| 5,150,781 | 9/1992 | Deisenroth et al. ............ | 198/349.8 |
| 5,186,308 | 2/1993 | Munro ............................ | 198/575 X |
| 5,341,916 | 8/1994 | Doane et al. .................. | 198/460.1 |
| 5,399,063 | 3/1995 | Passero ........................... | 414/798.9 |

FOREIGN PATENT DOCUMENTS

| | | |
|---|---|---|
| 0083913 | 7/1983 | European Pat. Off. . |
| 0385245 | 9/1990 | European Pat. Off. . |
| 0463878 | 1/1992 | European Pat. Off. . |
| 2182299 | 10/1986 | United Kingdom . |
| 2197283 | 10/1987 | United Kingdom . |
| 9315005 | 8/1993 | WIPO . |

*Primary Examiner*—James R. Bidwell
*Attorney, Agent, or Firm*—Ware, Fressola, Van Der Sluys & Adolphson LLP

[57] ABSTRACT

An automatic system for phasing advancing articles having a planar supporting base and a method of phasing objects with this device. The method allows the collection in real time of data concerning the position of the articles (OG), transmit it to an aggregation center (MCR), storing it in a data structure and reprocessing it for determining variations of speed to be imparted to the articles, and sending commands to interfacing means (MAL) towards motors (4). The system comprises individually motorized transport modules (MCS) disposed on a frame (T) and defining a sliding plane for the objects, optical sensors (SO) disposed interstitially to MSC modules for detecting instantaneous data on the position of the objects, and automatic steering and control means (UGC) for changing the speed of the articles so as to create a predetermined gap therebetween, by receiving from sensors (SO) feed back data and changing the speed of modules MSC by acting on a main shaft (2).

12 Claims, 7 Drawing Sheets

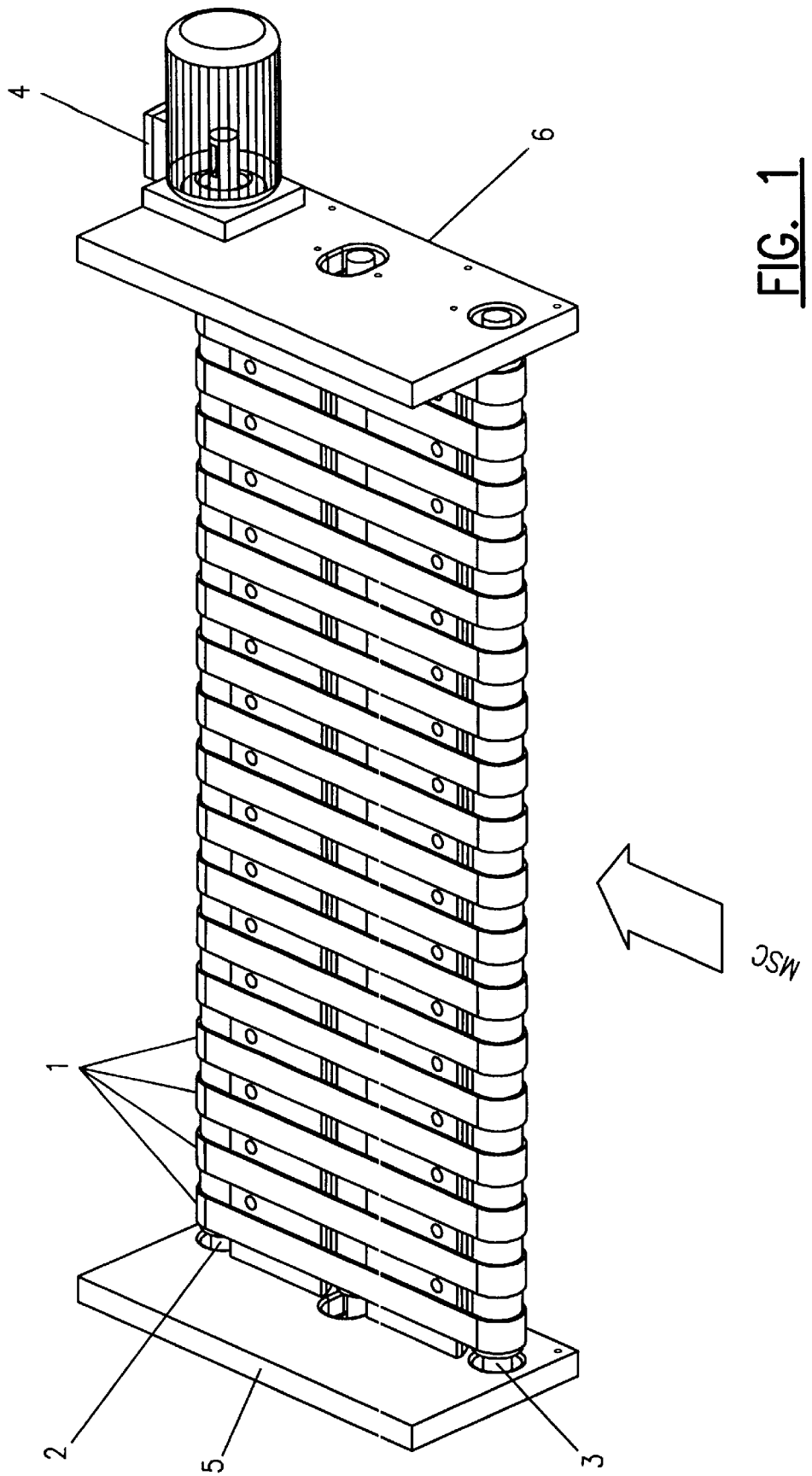

METHOD AND AUTOMATIC SYSTEM FOR PHASING ADVANCING ARTICLES HAVING A PLANAR SUPPORTING BASE

BACKGROUND OF THE INVENTION

1. Technical Field of the Invention

The present invention relates to an automatic system for phasing advancing articles having a planar supporting base, the separation step being eventually carried out by the system itself, and to a method of phasing the articles with this system.

2. Discussion of Related Art

Conventional singler devices receive adjacent articles at their inlet and output separated articles; these articles are usually sequenced, but they are time-spaced unevenly each from the other.

A singler device is disclosed in the Italian patent n. 01255541 (corresponding to U.S. Pat. No. 5,399,063) to the Applicant.

In automatic equipment for handling articles or goods, very often it is necessary to sequence, according to a predetermined cadence, trains of articles outputted randomly by an upstream machine or system. This need arises from the fact that it is possible to remarkably increase the throughput of the downstream handling system by optimizing the sequences of the trains so as to space apart two consecutive articles by distances corresponding to the optimal distances required by the downstream machines.

Sometimes a constant delay between the articles may be necessary to be able to carry out subsequent operations on the articles (packing, labelling, bar-code reading and the like).

At present, solutions are known that carry out phasing operations on the articles with synchronous loading system, suitable for articles the same as each other and of pre-established dimensions, usually not easily switchable over phasing of articles having dimensions the same as each other but different from the pre-established ones.

One of these solution is disclosed by WO 93/15005 where incoming articles are synchronously engaged by pawls mounted on the feeder belt. In this embodiment the optical sensor senses "groups of items" as units to be checked. Solutions allowing the automatic phasing of articles having diffrent dimensions are not known; usually an operator carries out such operation manually.

SUMMARY OF THE INVENTION

The technical problem to which the present invention is directed is the provision of a device for phasing incoming articles, in particular of different dimensions, by outputting one or more sequences of articles with a predetermined space gap therebetween, without the intervention of the operator.

According to the present invention, a method of phasing articles, in particular coming out from a singler device, comprises the steps of: collecting in real time information on the relative and reciprocal position of the articles; transmitting the information to a data aggregation center; storing such information in a flexible data structure; extracting said information from said data structure and reprocessing it for determining actions of speed variation to be imparted to said articles; and sending commands to a local interfacing means for providing said commands to means for carrying out said actions on the articles as determined in the foregoing steps.

Further according to the invention, a system for phasing articles having a planar supporting base, in particular coming out of a singler device, comprises: a plurality of transport means individually motorized and disposed on a frame, in particular designed to define a sliding plane for the articles; a plurality of optical sensors interstitially of said individually motorized transport means and designed to detect instantaneous data on a relative position of each article; and automatic steering and control means designed to change the speed of each article in order to create a predetermined gap between the articles by receiving from said optical sensors feedback data containing information on the relative position of each article and then processing said data to determine actions for driving said transporting means so as to change their speed.

Further advantageous aspects of the invention are set forth in the dependent claims.

BRIEF DESCRIPTION OF THE DRAWINGS

The invention will now be described in greater detail with reference to the attached drawing in which:

FIG. 1 shows an example of a motorized controlled synchronous module (MSC), adapted for the handling of a single train of incoming articles in accordance with the invention;

DETAILED DESCRIPTION OF PREFERRED EMBODIMENTS OF THE INVENTION

Figure 1A:
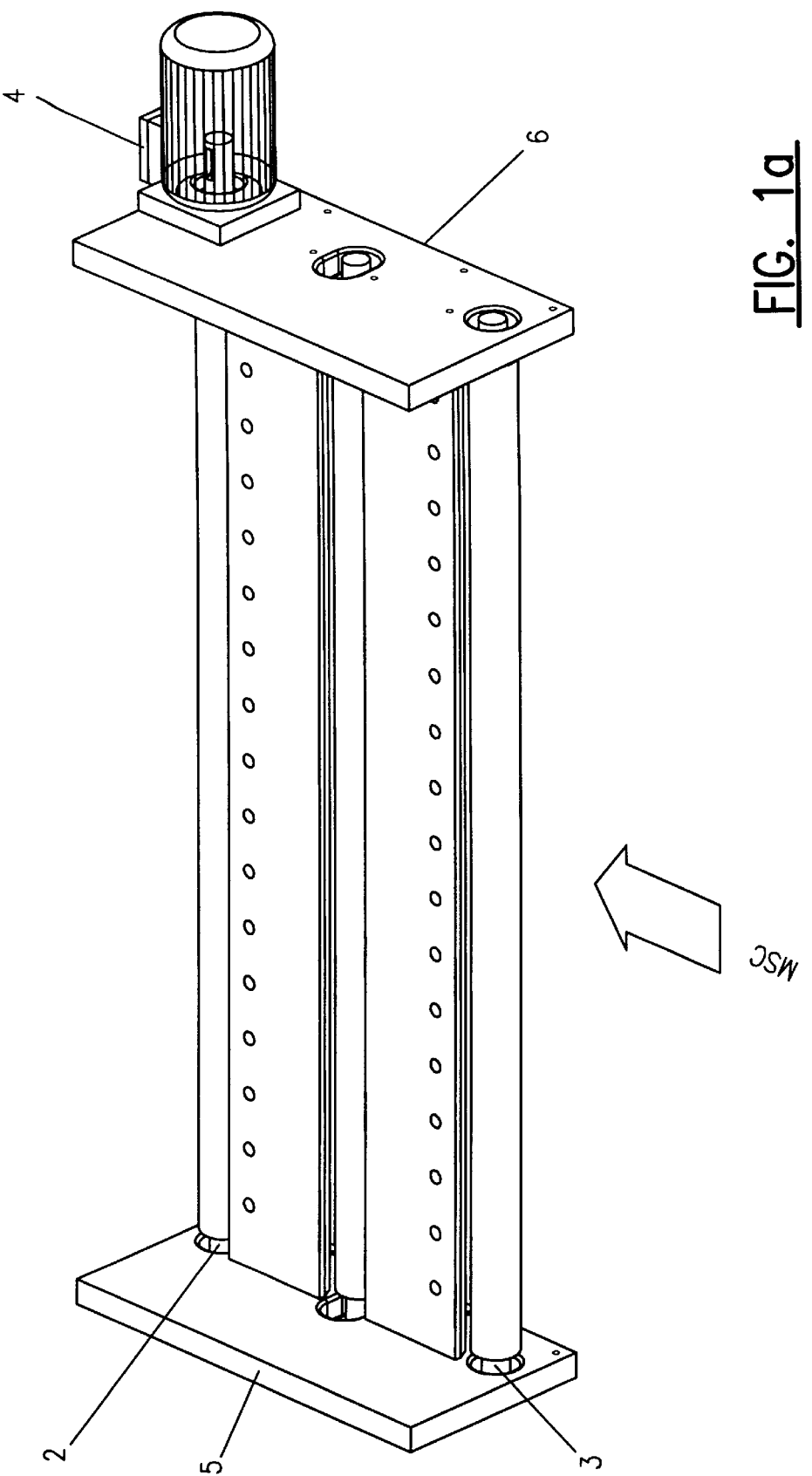
FIG. 1a shows an alternative embodiment which uses rollers for dragging means.

In FIG. 1 there is illustrated an example of motorized controlled synchronous module MSC, constructed with a plurality of looped belts, eventually toothed with a distance between belt centers small enough, e.g. 200 mm, so as to allow a good resolution to the steering and control unit, which will be described later on. The module MSC illustrated in the figure is called synchronous because all belts forming it have the same speed and are in phase each other.

The belts are mounted on a pair of channelled shafts: a main shaft 2 and a driven shaft 3.

The main shaft is driven by a motor 4, e.g. a brushless one, receiving from the steering and control unit (UCG) not shown in the figure, the parameters that allow the change, in real time, of the dyamic characteristics of the system e.g., speed, acceleration and time constant of the system.

The two shafts 2,3 are supported by a pair of parallel supporting plates 5,6.

FIG. 1a shows the module of FIG. 1 with the belts removed which exposes the shafts (2,3) to view. The module in FIG. 1a serves as an alternative embodiment which relies on using the shafts (2,3) as rollers for dragging means.

An alternative construction of a controlled synchronous module MSC consists in using rollers driven by the above pair of shafts.

Figure 1B:
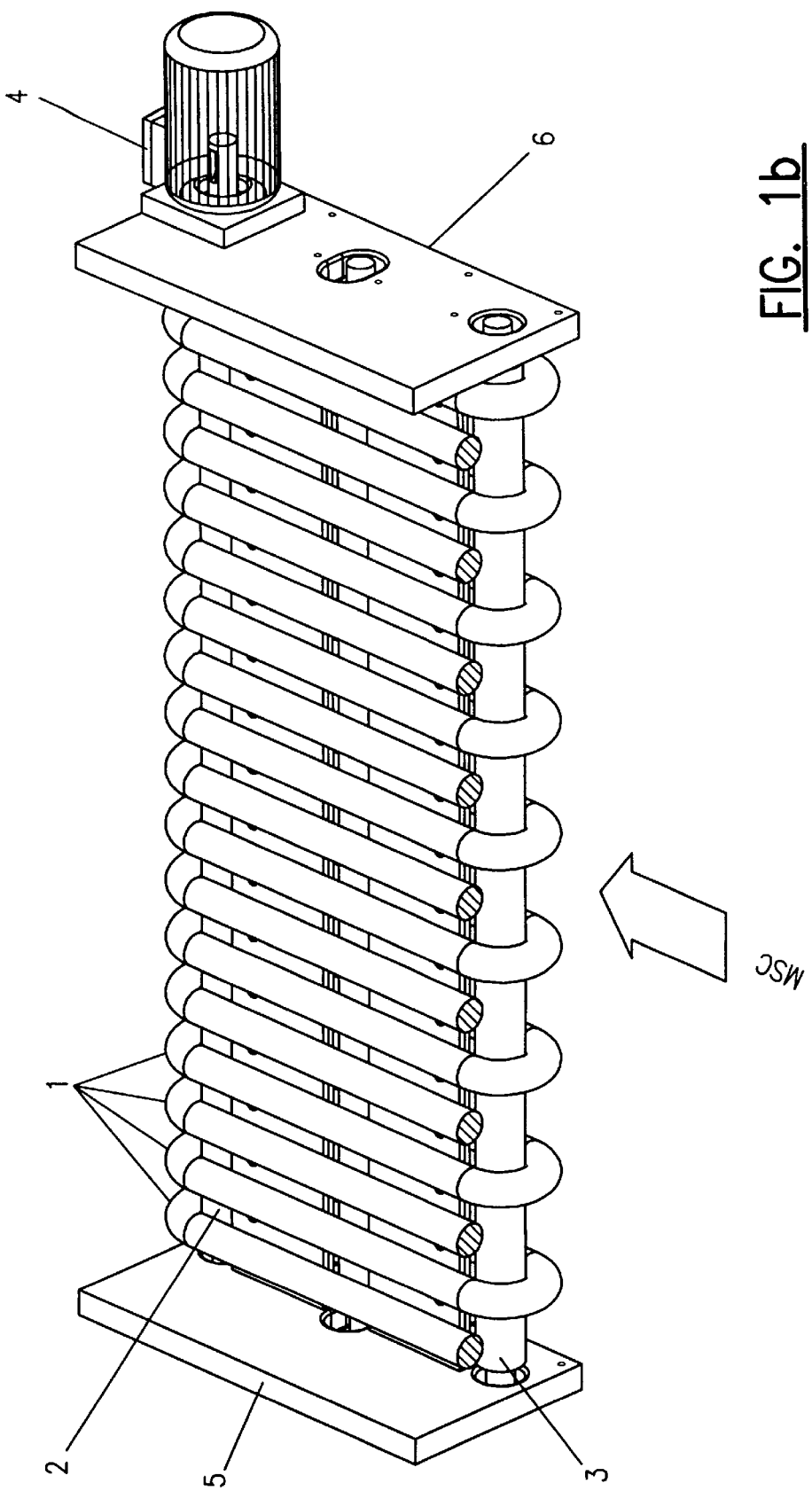
FIG. 1b shows an alternative embodiment which uses round rubber belts for dragging means.

FIG. 1b shows another alternative construction of a controlled synchronous module MSG consisting using round rubber belts (so-called polycords) extending between the two shafts 2,3 so as to form a mobile support for the advancing articles. Such embodiment as shown in FIG. 1b allows the insertion of optical sensors in the sliding plane in an effective manner so as to get information on the advancing articles directly from their base, in contrast with the prior art where the optical sensor are usually disposed at the side of the sliding surface thus permitting of sensing the articles only at a predetermined height, and therefore unable to sense articles below such height.

Moreover, the presence of optical sensors in the sliding plane is particularly advantageous e.g. in connection with articles unevenly wrapped in sheets of plastic where valleys present on the wrapping could lead to an erroneous detection of several advancing articles by a photocell that carries out a lateral read out; since such valleys rarely can be found on the supporting base of the articles which is more uniform, a read out by a photocell disposed in the sliding plane is more reliable.

Figure 2:
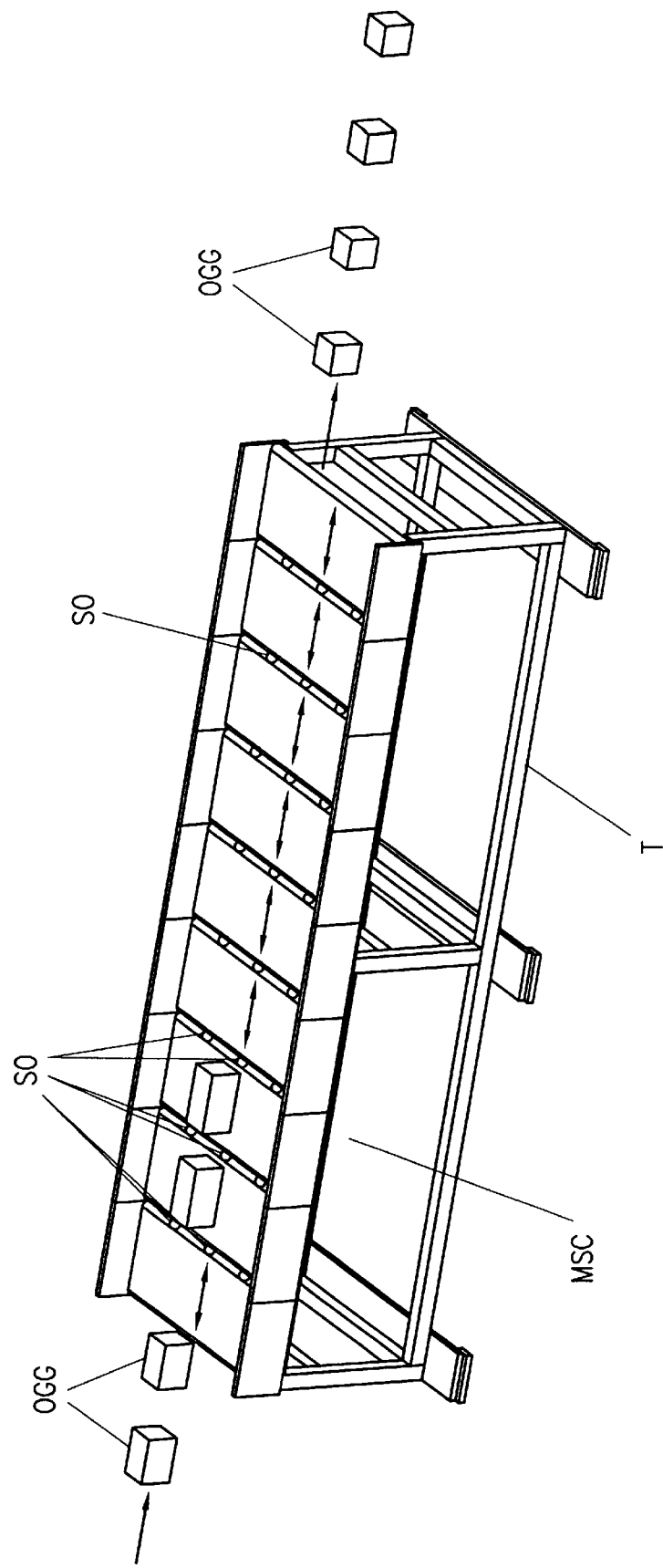
FIG. 2 shows an example of assembling controlled synchronous modules and optical sensors, as well as the operation principle of the system, relative to the mechanics in case of handling a single train of incoming articles.

FIG. 2 shows schematically an example of assembling several controlled synchronous modules MSC series-mounted on a sole frame T on which optical sensors (SO) are disposed to collect in real time information related to the passage of the articles and to their reciprocal position for transmitting to a steering and control unit (UCG) not shown in the figure.

Associated with each controlled synchronous module MSC is a motor 4 (see FIG. 1) which controls it individually, according to the reprocessing of data on the relative position of the advancing articles on the ith module MSC, detected by the optical sensors SO.

An embodiment optimizing the system efficiency provides for the use of controlled synchronous modules MSC having different sizes and series-mounted so as to receive the incoming article with an MCS module having dimension greater than the dimension of the smallest article and subsequently modules having increasing dimensions.

Such embodiment allows the slight increase in the gap between consecutive articles, thus decreasing the number of motors used.

Figure 3:
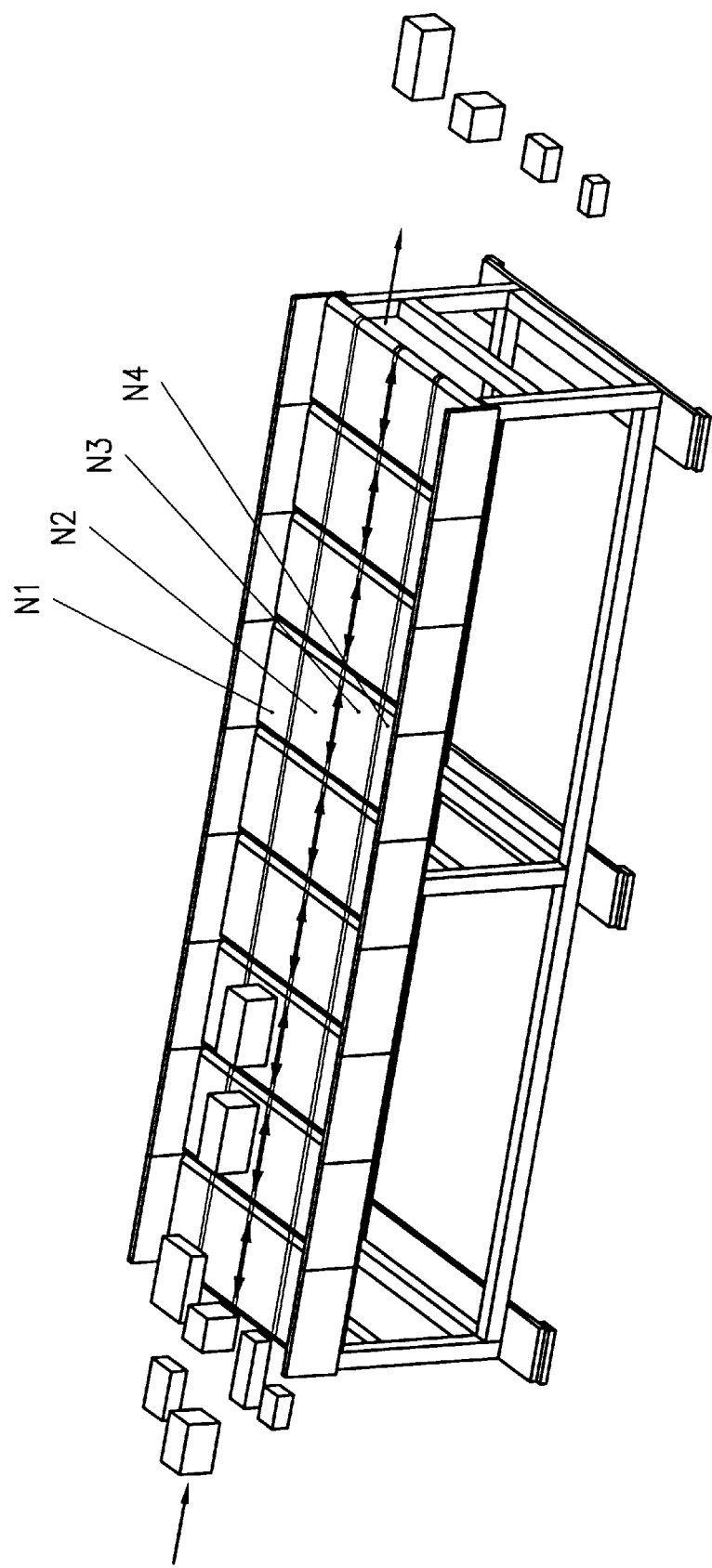
FIG. 3 shows the operation principle of the system, relative to the mechanics in case of handling several parallel trains of incoming articles.

FIG. 3 illustrates the operation mode of the system, relative to the mechanical portion, when handling several parallel trains of incoming articles.

The articles enter the system with a non-defined order and come out all aligned with each other.

To this end, every controlled synchronous module MSC can be composed of independent and individually motorized belts N1, N2, N3, N4 . . . The sequence of the i-th belt over each module MSC establishes a path on which the i-th train of incoming articles to the system can be advanced.

Figure 4:
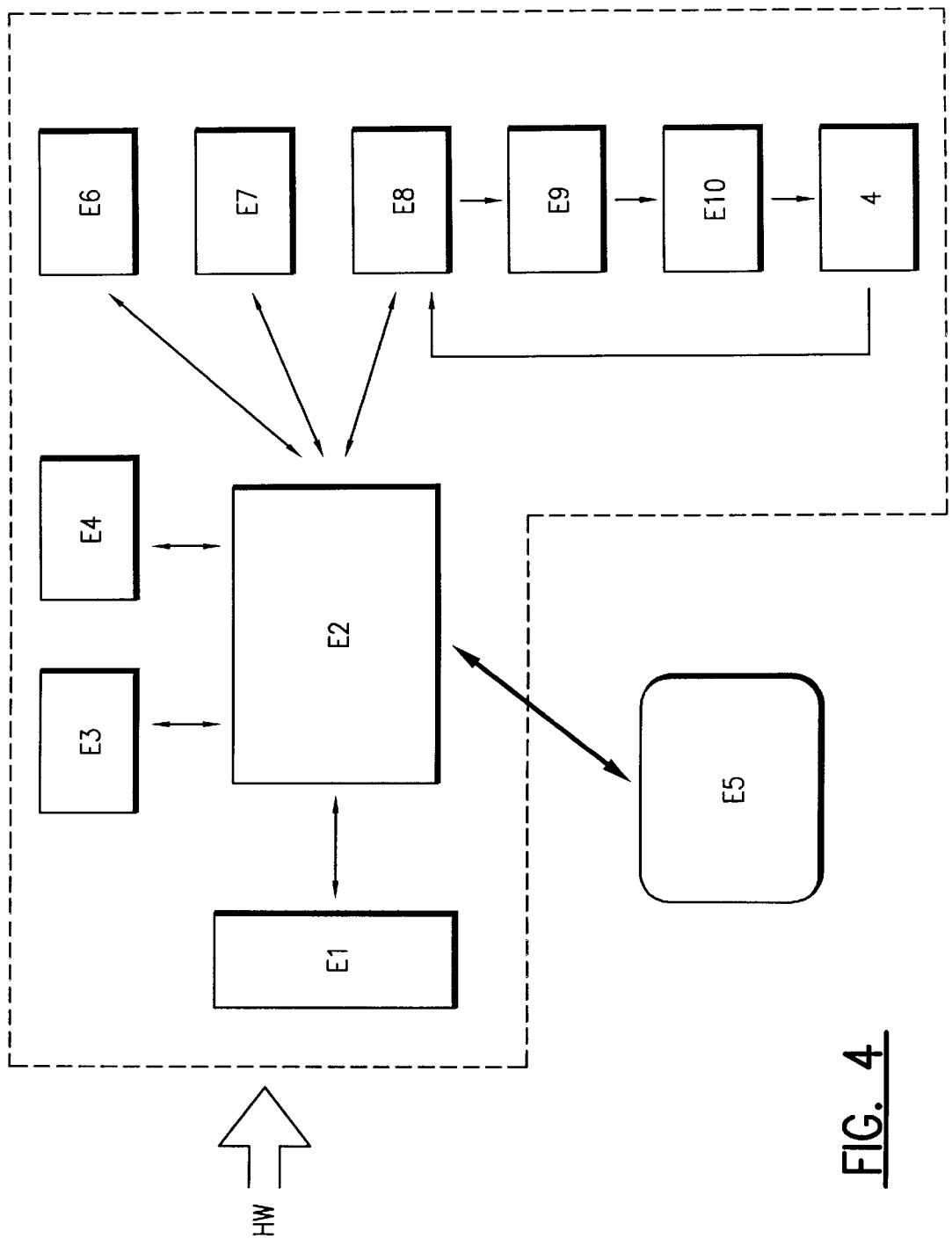
FIG. 4 shows an example of architecture of the module comprising the phasing system control circuitry in accordance with the invention.

FIG. 4 illustrates an embodiment of a module containing the circuitry relative to the steering and control unit (UCG).

Optical sensors SO are interconnected with the UCG. They send signals, through a parallel port E1, to processor E2 which processes them through an application software module E5.

UCG updates storage E3 in real time on the position of the articles that are advancing over the i-th module MSG, and the re-read out of the optical sensors provides also information on the result obtained through the previous actions executed by the device on the articles.

The field storage E3 contains, in a binary form, the situation, at a certain instant, of the dynamic process in progress, in terms of absolute and relative positions of the advancing articles.

The parameter storage E4 contains the set of reference values to the articles and to the kind of application.

The appllication software module E5 implements the procedures and the algorithms such as to allow motor 4 to carry out suitable actions on the articles advancing on the device so as to obtain the reference values contained in the parameter storage 4.

The application software module E5 allows an operator to handle the system by means of a programming console.

The user storage E7 is used for program updating.

Motor control block E8 processes and translates data produced by application software E5 into command matrices which, through a digital-to-analog interface E9 (DAC 16 bits), are passed to the actuating module E10 that transforms them into suitable voltage-current values before exciting motor 4. Module E10 provides control and feeding to synchronous motor 4. Such motor can preferably be a brushless type -magnet motor which allows the achievement of good torques along with compactness.

Components Ei described above can be either located on a single hardware module or distributed and duplicated over several hardware modules interconnected each other and positioned at different parts of the system.

Figure 5:
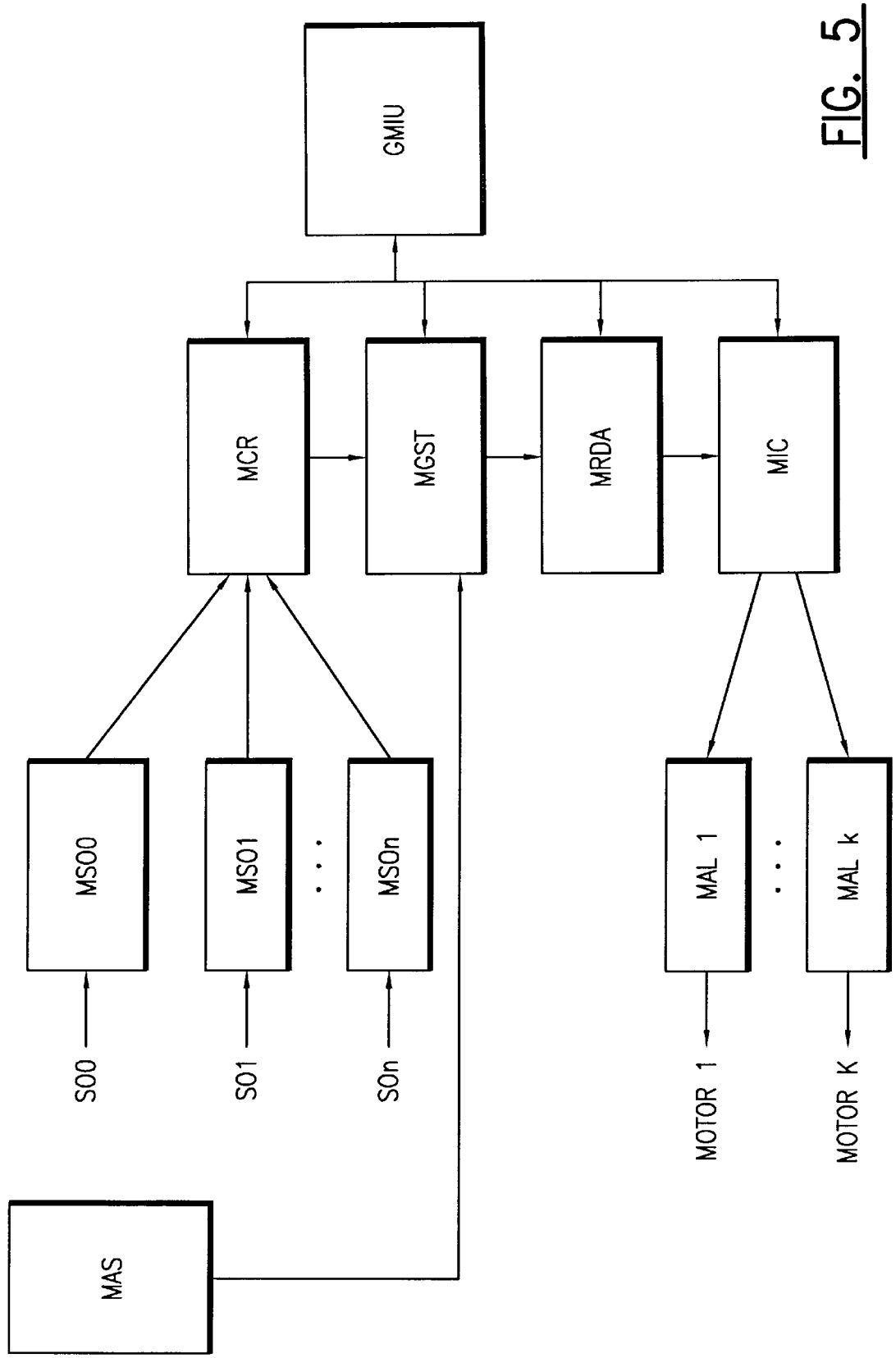
FIG. 5 shows the architecture of the program modules for the control of the phasing system in accordance with the invention.

FIG. 5 illustrates the architecture of the application software module E5 that, along with the HW circuitry, forms the UCG unit for steering and controlling the phasing system in accordance with the invention.

Such architecture includes cooperating modules which implement a method as described below.

In the figure there are represented in local modules MSOo . . . MSOn for collecting general purpose input data, through which the control system knows the input data on which the described outputs are generated (sensors SOo . . . SOn are connected to these modules MSO). The function of the modules MSOo . . . MSOn is to update in real time the state of MGST module relative to the position of the articles OG advancing on the phasing device.

The central data-collection module MCR takes it on itself to suitably filter the required combinations of the inputs transmitted by modules MSOo . . . MSOn.

The data structure management module MGST is that procedure which processes the data transmitted by module MCR in order to go back to the ideal gaps of the advancing articles suitably stored in its own data structure.

Module MRDA for reprocessing and determining actions receives the information extracted from the data structure of module MGST, reprocesses it to determine the suitable actions to be imparted on the articles advancing on the phasing device in terms of speed variation thereon according to suitable acceleration or deceleration ramps calculated by it.

The command transmission module MIC is a module that, according to the inputs received from module MRDA and taking account of the present state of modules MSC (in terms of instantaneous speed, acceleration or deceleration), modulates suitably the commands on the advancing articles.

The local agent modules MAL1 . . . MALk are those which, once received commands from module MIC to be imparted to respective motors (4) driving the respective modules MSC, transmit them to the actuating means in a fair amount i.e. such that their good functionality is not impaired (they carry out a control so that the maximum acceleration, deceleration and speed of the system are not exceeded). There is also a user interface management module GMIU that allows the operator to interact with system, meaning that the state of suitable variables of the system being known, it is possible to change, when desired, the map of ideal gaps stored in the module MGST so as to make the system completely flexible according to the needs of the user.

The system is of multitasking type and carries out a copy of the application software module E5 for each article advancing in the system.

Every task is activated when an article gets on the controlled synchronous module MSC and it takes care of the article until it gets out of the system; subsequently the task is ended.

An example of software structure comprises the following tasks:
- one task for the initialization of the system variables,
- three tasks for the handling of eventual three articles present on three MSC modules,
- one task for gap detection,
- one task for interfacing to an eventual outside device (e.g. a PLC),
- one task for interfacing to an operator,
- one task for configuration system management, detection and automatic correction of malfunctions and feature control.

An example of operation steps of the application software E5 is now described.

In a first step of system initialization, a system autotuning module MAS actuates and guides all the motors in order to acquire data concerning the characteristics of each individual motor and their regulation for the control of small sudden speed variations. The personalization data are collected, re-processed and stored into a data structure handled by a data structure management module MGST.

Among collected data there are e.g.: maximum current deliverable by actuating module E10, current relative to continuous operation; a special limit curve is determined for each motor/drive system in order to trigger a protection that intervenes to disable the activation when an average intensity Im outside such curve occurs.

Calibration is performed by acting on a speed ring and in particular on parameters Kp, Ki, Kd as will be explained below.

In accordance with the PID (Proportional Integral Derivate) standard regulator theory, the gain constants are calculated:

Kp: stability of the system in terms of speed loop proportional gain. The product of Kp by the difference between the speed command and the effective speed of the motor generates the command for the torque loop: a high value of such paramenter decreases the error between the commanded speed and the effective speed and decreases the time necessary to reach the commanded speed; a too high value causes on the other hand an increase in the pass-band at the speed loop itself that could trigger instability problems in the system and increase in noise.

Ki: elongation; integral gain; its effect is to force the motor speed to follow the commanded speed with precision. Usually, it is used for increasing the speed-loop stiffness by reducing thereon the effects of the variations introduced on the motor by the mechanics. By increasing Ki an increase in the so-called "overshoot" (oscillations inside the system due to sudden speed variations) is obtained, whereby a high value thereof leads the system to instability.

Kd: gain derived from the speed-loop; system quickness in terms of response velocity. It reduces the overshoot and torque resonances between mechanics and motor.

The value associated with the above parameters should be as small as possible in order to reduce stresses on mechanical parts, so as to allow the achievement of the desired features.

A good determination of such values allows an efficient and effective control of the system by the UCG.

The installer is assisted by a specialized application module in checking the calculation of such parameters during the regulation of the drive/motor system.

During normal operation of the system, every article is at first examined when entering and data relative to dimension, surface of the advancing article and distance between the trailing edge of this article and the leading edge of the subsequent one are detected by photocells. These data are collected by a data collection local module MSO and subsequently sent to a data collection central module MCR which carries out a reprocessing of such data in order to determine, in a first approximation, volume and weight of the articles, which will be used for calculating the necessary acceleration that the motor shall impart to the article. These data are sent to data-structure management module MGST. This module, in a first step of system initialization, reads out from a read only memory ROM the configuration data and creates an initial data structure.

The data structure can be, e.g., a static data structure implementing a table associating the article length with a value relative to the ideal gap between the article itself and the next one.

An example of table can be the following:

| ARTICLE CATHEGORIES | ARTICLE LENGTH | IDEAL GAP |
| --- | --- | --- |
| small | 0< = X < 15 cm | 40 cm |
| medium | 15< = X < 30 cm | 55 cm |
| large | 30< = X < 60 cm | 65 cm |
| extra large | 60< = X < 120 cm | 75 cm |

An example of static data structure is an array with indirect addressing that, with each dimension, associates, as an input index, a memory address indicating the recommended gap value. The gap variation so calculated according to:

delta GAP=GAP ideal−GAP real where the value of the difference can be either positive, negative or zero.

if delta GAP>0 then GAP ideal>GAP real
the article must be spaced apart from the following one.

The steering and control unit UCG evaluates on how many synchronous modules MSC the gap has to be recovered in terms of number of modules necessary to contain the entire article. Moreover, it evaluates how many synchronous modules are to be accelerated as a function of the dimension of the article.

If, for instance, one decides to recover delta GAP on the MSC modules, the steering and control unit evaluates if:
- it is possible to accelerate the first MSC module by an amount equal to delta GAP/3: the gap foreseen is recovered;
- it is possible to accelerate the first MSC module by an amount less than delta GAP/3: all the possible space is recovered; the lacking space will be recovered subsequently;
- it is not possible to accelerate the first MSC module: the operation is sent to the subsequent belts; if this is not possible, the subsequent article is decelerated.

In a second operation step the data structure management module receives from module MCR data concerning the article length and as function of the latter, extracts from the data structure information concerning the ideal gap value between the article itself and the next one in order to determine the actions to be taken on the article.

In order to determine the action to be taken to obtain the ideal gap, the overall space in front of the article in question, along all the path as a whole, is taken into account and the acceleration to be imparted to the article is calculated; if it is no longer possible to carry out such operation for lack of space, the space at the back of the article in question is taken into consideration as an alternative in order to slow down the subsequent article.

For calculating the preceding gap, the gap required by the article preceding the one just entered into the system is taken into account; in fact, the space available for accelerating an article must be subtracted from the gap required by the article preceding it.

In determining corrective actions, it is checked that the required speed does not excede the maximum speed allowable by the mechanical part, in accordance with configuration data stored in the data structure.

Once the acceleration or deceleration action has been determined, the corresponding command is sent to the involved motor, checking that the latter has already carried out an eventual preceding command, otherwise the status is initialized again.

The relative position of each article advancing inside the system is re-examined at several instants thus receiving a feedback from the field, so as to check the adjustment of the article with the ideal gap contemplated; should the difference between actual gap and ideal gap be different from zero, actions are started to make the article fall into step.

By suitably programming the UCG unit, the first n controlled synchronous modules MCS can be driven for separating simple articles from an incoming of train adjacent articles and the subsequent modules are drivable for producing predetermined gaps between the separated articles.

An example of configuration data of the system is given below, where the evaluation of values assigned to some of them is used for determining the values to be assigned to subsequent configuration data:

- minimum and maximum dimension of the incoming articles;
- weight of the articles, approximately estimated as a function of the detected dimensions;
- dimension of gaps to be created between the outgoing articles;
- type of motor: as a function of the weight of the articles and of the function coefficients one calculates the necessary force, the relative work=force X displacement and the suitable motor power is deduced;
- type of actuation E10;
- type of system for transmission of motion, relative to the motor 4/belt 1 coupling, as a function of the moments of inertia and speed to be realized; for instance, pulleys mounted on shaft 2 and belt 1, whose circumferences are dimensioned as a function of the estimated speed: the magnitude (turns/minute) relative to the motor allows the calculation of the speed in m/s both of an average value of normal operation corresponding to the speed that articles must have at the outlet and of a peak value for the instantenous speed during transportation in the system;
- type of axis control E8 that, as a function of the PID gain constants (Kp, Ki, Kd) handles the acceleration/deceleration commands);
- type and number of controlled synchronous modules MSC present in the system, as a function of the minimum dimension of the incoming articles: the optimal solution provides for the use of differentiated-dimension modules, where the first of them has dimension slightly greater than the dimension of the smallest article so as to be able to exclude the presence of several articles on the same module.

In conclusion, the phasing system in accordance with the invention is formed by a mechanical device having a specific electronic steering driven by software associated therewith, that allows the dynamic control of the position of articles having various shape or dimension during their advancing on said device, by receiving a feedback from the field, reprocessing it to obtain information to be used in determining corrective actions on the speed of the k-th article by acting on the motor that drives the i-th controlled synchronous module MSC in order to output articles having predetermined speeds and gaps, by optimizing the random spaces existing between the articles.

ABBREVIATIONS AND SYMBOLS

Ucg Steering and control unit
SO Optical sensor/photocell
OG Article
HW Control circuity module
MAS System autotuning module
MSO Local data collection module
MCR Central data collection module
MGST Data structure management module
MRDA Reprocessing and action determination module
MIC Command sending module
MAL Local agent module
GMIU User interface module management
MSC Controlled synchronous module
E1 Parallel port
E2 Processing unit
E3 Field memory
E4 Parameter memory
E5 Application software module
E6 Control element
E7 User storage
E8 Motor control block
E9 Digital-to-analog interface
E10 Actuating module
1 Dragging means
2,3 Shafts
4 Motor
5,6 Bearing plates

We claim:

1. Method of phasing articles, in particular coming out from a singler device, comprising the steps of:
   - collecting in real time information on the relative and reciprocal position, and dimensions, of the articles (OG);
   - transmitting the information to a data aggregation center (MCR);
   - storing such information in a flexible data structure;
   - extracting said information from said data structure and reprocessing (MRDA) it for determining actions of speed variation to be imparted to said articles; and
   - sending commands to a local interfacing means (MAL) for providing said commands to means (4) for carrying out said actions on the articles as determined in the foregoing steps.

2. Application software module (E5) designed to process input data received from a plurality of optical sensors (SO)

and generate at the output commands for driving a plurality of individually motorized transport means (MSC) and implementing the method claimed in claim 1, said application software module being of the type comprising:

means (SO) for collecting in real time information on the relative and reciprocal position of incoming articles (OG), means for transmitting said information to a data aggregation center, means for storing said information in a flexible data structure, on said second memory (E4), means for extracting information from said data structure on said second memory (E4) and transfer them on said first memory (E3) for the reprocessing able to determine actions for increasing or decreasing the speed of the articles, means for sending commands to local interfacing means (MAL) for providing said commands to means (4) for carrying out said actions on the articles, and interaction handling means (E6) designed to handle an interface between a system including said software module and a user.

3. System for phasing articles having a planar supporting base, in particular coming out of a singler device, comprising:

a plurality of transport means (MSC) individually motorized and disposed on a frame (T), in particular designed to define a sliding plane for the articles;

a plurality of optical sensors (SO) located under said sliding plane of said individually motorized transport means (MSC) and designed to detect instantaneous data on a relative position and the dimensions of each article (OG); and automatic steering and control means designed to change the speed of each article in order to create a predetermined gap between the articles by receiving from said optical sensors (SO) feedback data containing information on the relative position of each article, and the dimensions of each article, and then processing said data to determine actions for driving said transporting means (MSC) so as to change their speed.

4. System for phasing articles according to claim 3, characterized in that said steering and control means (UCG) comprises:

a control circuitry module (HW) and an application software module (E5), said module cooperating for carrying out control of the system.

5. System for phasing articles according to claim 4, characterized in that said control circuitry module (HW) comprises:

a parallel port (E1) designed to receive signals from a plurality of optical signals from a plurality of optical sensors (SO) and send them to a processing unit (E2), wherein said processing unit (E2) is designed to process the input data through an application software module (E5), a first memory (E3) designed to contain, in a binary form, data relative to an instant of a dynamic process in progress, a second memory (E4) designed to contain, in a binary form, data relative to the articles and to a type of application, a control element (E6) capable of handling a system interface between said system and a user, a third memory (E7) capable of containing, in a binary form, data relative to values used by said application software module (E5) during a processing step, a motor control block (E8) designed to process and translate data produced by said application software module (E5) into command matrices, an interface (E9) designed to convert an input digital signal from said motor control block (E8) into an output analog signal, an actuating element (E10) designed to transform input analog signals from said interface (E9) into output voltage values, and a motor (4) designed to receive voltage values from said actuating element (E10) for driving a main shaft (2).

6. System for phasing articles according to claim 3, characterized in that a singler device is incorporated in it so that a first group of controlled synchronous modules carries out a separation of the articles.

7. Controlled synchronous module (MSC) for use as individually motorized transport means in a system for phasing articles, said module comprising:

a pair of parallel plates (5,6), a pair of parallel shafts (2,3), extending between said plates and having respective ends thereof rotatably supported thereon, a motor (4) connected with an end of one (2) of said shafts and designed to rotate it, means (1) for dragging the articles (OG), extending between said shafts (2,3) and rotated by said one (2) of said shafts, for supporting and advancing said articles, and a plurality of optical sensors (SO) located under a sliding plane formed by said dragging means wherein said optical sensors are for detecting instantaneous data on a relative position of, and the dimensions of, each article (OG).

8. Controlled synchronous module (MSC) according to claim 7, characterized in that said means (1) for dragging comprises at least one closed loop belt rotated by said shafts (2,3).

9. Controlled synchronous module (MSC) according to claim 7, characterized in that said means (1) for dragging comprises rollers rotated by said shafts (2,3).

10. Controlled synchronous module according to claim 7, characterized in that said means for dragging comprises a plurality of rubber round belts or polycords rotated by said shafts (2,3).

11. Controlled synchronous module according to claim 7, characterized in that said means for dragging comprises a plurality of independent and individually motorized dragging belts (N1, N2, N3, N4 . . . ).

12. Controlled synchronous module according to claim 7, characterized in that said motor is a brushless one.

* * * * *

UNITED STATES PATENT AND TRADEMARK OFFICE
CERTIFICATE OF CORRECTION

PATENT NO : 5,979,636
DATED : November 9, 1999
INVENTOR(S): Vanacore et al

It is certified that error appears in the above-identified patent and that said Letters Patent is hereby corrected as shown below:

Title page, item [30], line 2, please cancel "Jul. 6, 1996" and substitute --Jul. 8, 1996-- therefor.

Signed and Sealed this

Eighteenth Day of July, 2000

Attest:

Q. TODD DICKINSON

*Attesting Officer*     *Director of Patents and Trademarks*